United States Patent
Steinicke et al.

(10) Patent No.: US 6,719,359 B2
(45) Date of Patent: Apr. 13, 2004

(54) MOTOR VEHICLE WITH AN UNDER BODY

(75) Inventors: Hartmut Steinicke, Ingolstadt (DE); Helmut Sponer, Gaimersheim (DE); Martin Angel, Kosching (DE)

(73) Assignee: Audi AG (DE)

( * ) Notice: Subject to any disclaimer, the term of this patent is extended or adjusted under 35 U.S.C. 154(b) by 0 days.

(21) Appl. No.: 10/333,818
(22) PCT Filed: Mar. 16, 2001
(86) PCT No.: PCT/EP01/03057
§ 371 (c)(1), (2), (4) Date: Jan. 27, 2003
(87) PCT Pub. No.: WO02/22432
PCT Pub. Date: Mar. 21, 2002

(65) Prior Publication Data
US 2003/0173798 A1 Sep. 18, 2003

(30) Foreign Application Priority Data
Sep. 15, 2000 (DE) .......................... 100 45 640

(51) Int. Cl.$^7$ .............................................. B62D 35/02
(52) U.S. Cl. .................... 296/180.1; 296/198; 180/903; D12/181
(58) Field of Search ............... 296/180.1, 198, 296/204, 208; 180/903; D12/169, 181

(56) References Cited

U.S. PATENT DOCUMENTS

| | | | | |
|---|---|---|---|---|
| 4,569,551 A | * | 2/1986 | Rauser et al. ............ | 296/180.1 |
| 4,772,060 A | * | 9/1988 | Kretschmer ............... | 296/180.1 |
| 4,778,212 A | * | 10/1988 | Tomforde ................. | 296/180.1 |
| 4,810,021 A | * | 3/1989 | Burst ..................... | 296/180.1 |
| 5,511,847 A | | 4/1996 | Weisbarth et al. ....... | 296/180.1 |
| 5,820,203 A | * | 10/1998 | Morelli et al. .......... | 296/180.1 |
| 6,033,010 A | * | 3/2000 | Preiss ................... | 296/180.1 |
| 2003/0173798 A1 | * | 9/2003 | Steinicke et al. ........ | 296/180.1 |

FOREIGN PATENT DOCUMENTS

| | | |
|---|---|---|
| DE | 3347364 | 7/1984 |
| DE | 3712048 | 10/1988 |
| FR | 2575126 | 6/1986 |

* cited by examiner

*Primary Examiner*—D. Glenn Dayoan
*Assistant Examiner*—Paul Chenevert
(74) *Attorney, Agent, or Firm*—Stevens, Davis, Miller & Mosher, LLP

(57) ABSTRACT

The invention relates to a motor vehicle with underbody and wheels mounted in wheelhouses which are guided on wheel guide elements coupled to the body, functional elements being mounted in the area of wheel dishes opening inward, and with wheel spoilers mounted on the underbody in front of the wheels in the direction of travel, for the sake of better deflection of environmental influences such as dirt particles, moisture, etc the wheel spoilers of at least one wheel axle per wheel ending in a structurally simple configuration in a deflecting strip extending more or less vertically downward, the deflecting strips being extended continuously inward and rearward at least to the vertical central plane of the wheels extending through the axes of rotation of the wheels.

12 Claims, 2 Drawing Sheets

MOTOR VEHICLE WITH AN UNDER BODY

BACKGROUND OF THE INVENTION

DE 37 12 048 A1 discloses a vehicle wherein wheel spoilers consist in this instance essentially of two vertically positioned airfoils mounted on the underbody, with a cross-section becoming narrower in the longitudinal direction of the vehicle.

A spoiler device disclosed in U.S. Pat. No. 5,511,847 A comprises sections mounted upstream from the front wheels in the direction of travel, which sections deflect the oncoming air downward. Adjoining each of the sections toward the center of the vehicle is a section which guides the oncoming air toward the brakes.

DE 33 47 364 A1 discloses mounting of wheel spoilers in motor vehicles on the underbody in motor vehicles, passenger cars in particular, in the area upstream from the wheels; such spoilers improve the enveloping flow around aerodynamically unfavorable wheels. In addition, the underbodies, for example, in the front area of the motor vehicle and starting with the front apron, for example, are relatively smooth in surface and optionally one which is wedge-shaped and tapers toward the front. The underbody ends in the area of the wheels at dome-shaped wheelhouses mounted over the wheels. Passenger cars in particular also have efficient disk brakes which are positioned in the wheels, where they are relatively well protected from environmental influences.

SUMMARY OF THE INVENTION

The object of the invention is to provide even more efficient protection of the functional elements of the wheels and optionally the wheel suspensions from environmental influences at relatively small additional cost.

This object as well as others is obtained by the characteristics of the present invention. In accordance with the invention it is proposed that the wheel spoilers of at least one wheel axle, for example that of the front wheels, be caused to end in a deflecting strip projecting more or less vertically downward, this deflecting strip being lengthened continuously inward and to the rear at least as far as the vertical central plane of the wheels extending through the axes of rotation of the wheels. In accordance with the proposal made by the invention, a considerable proportion of the dirt particles, moisture from rain, etc. flowing along the underbody of the motor vehicle is guided around the wheels and thus deflected from the wheel dishes. The functional elements in question are accordingly subjected to less impact and afforded increased protection. It is sufficient if these continuous deflecting strips extend rearward at least more or less to the axes of rotation of the wheels, but if desired the deflecting strips may also extend farther rearward.

By preference the deflecting strips may extend along the edge between the underbody and the wheelhouses, being either built integrally with the wheel spoilers on the underbody or formed directly by extensions of the underbody and/or the wheelhouses.

The deflecting strips may directly constitute the wheel spoiler and in keeping with the aerodynamic requirements are wider in the area of the wheels than in the areas serving only to ensure deflection from environmental effects, which areas may be if necessary be only up to 20 mm wide.

BRIEF DESCRIPTION OF THE DRAWINGS

One embodiment of the invention is discussed in greater detail in what follows with reference to the schematic drawings, in which.

DETAILED DESCRIPTION OF THE INVENTION

Figure 1:
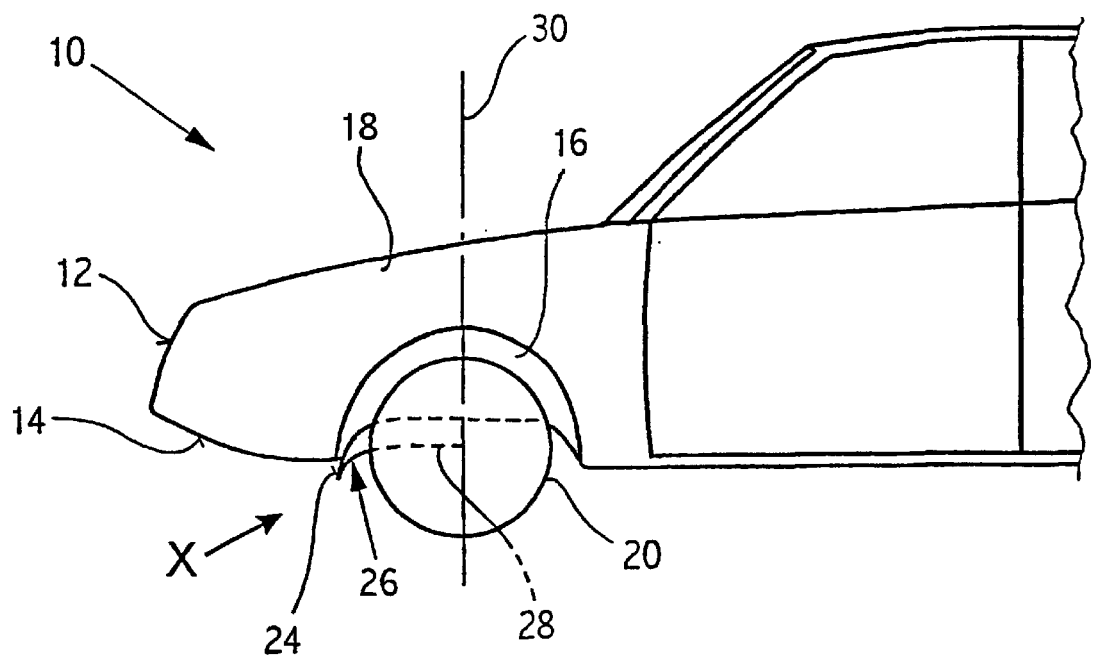
FIG. 1 illustrates a side view of the front area of a passenger car.
Figure 3:
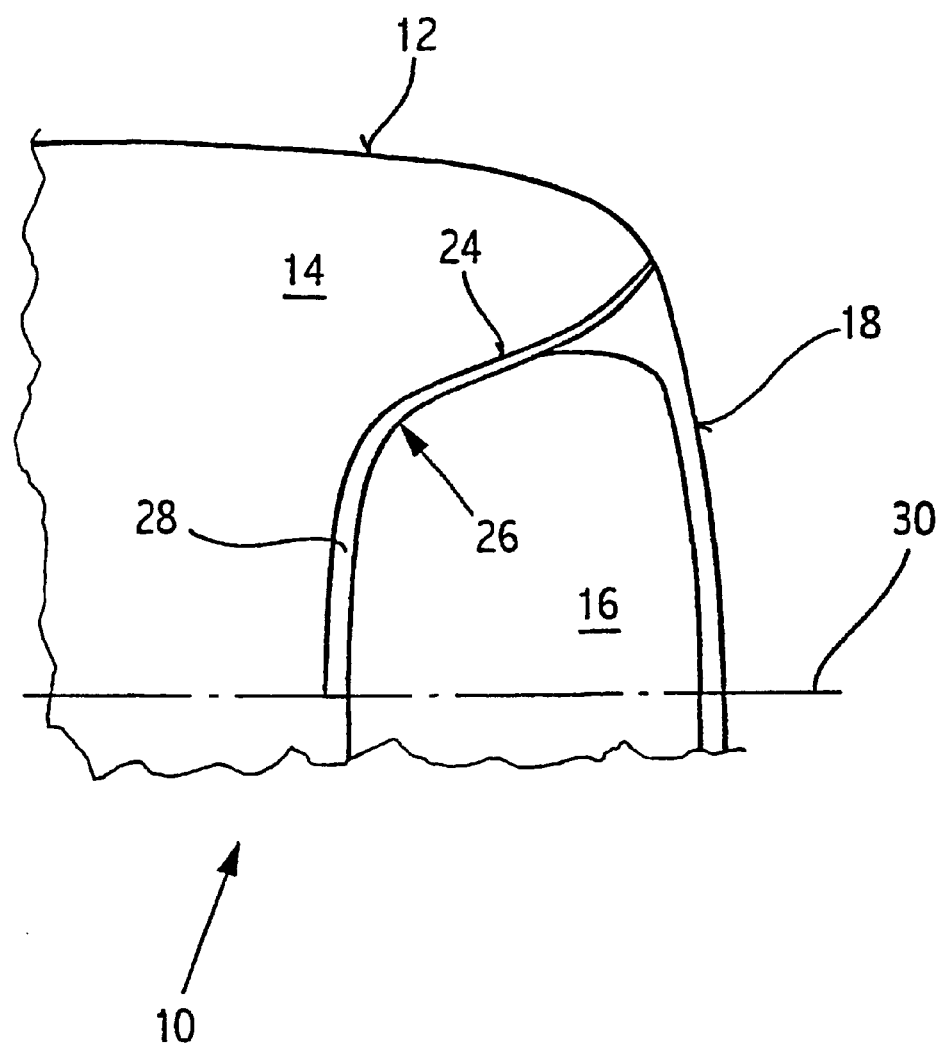
FIG. 3 illustrates a plan view from below of the front apron, the underbody, and the wheelhouse, also of the left front wheel of the passenger vehicle shown in FIGS. 1 and 2.

FIG. 1 shows in diagram form the front area of a motor vehicle, a passenger car 10 of known design, with a front apron 12, an underbody 14 tapering slightly like a wedge which, on the left side, for example (the right side is to be imagined as being the mirror image of the left), is bounded by a left wheelhouse 16 (also see FIG. 3). The wheelhouse 16 is covered on its exterior by the fender 18.

Figure 2:
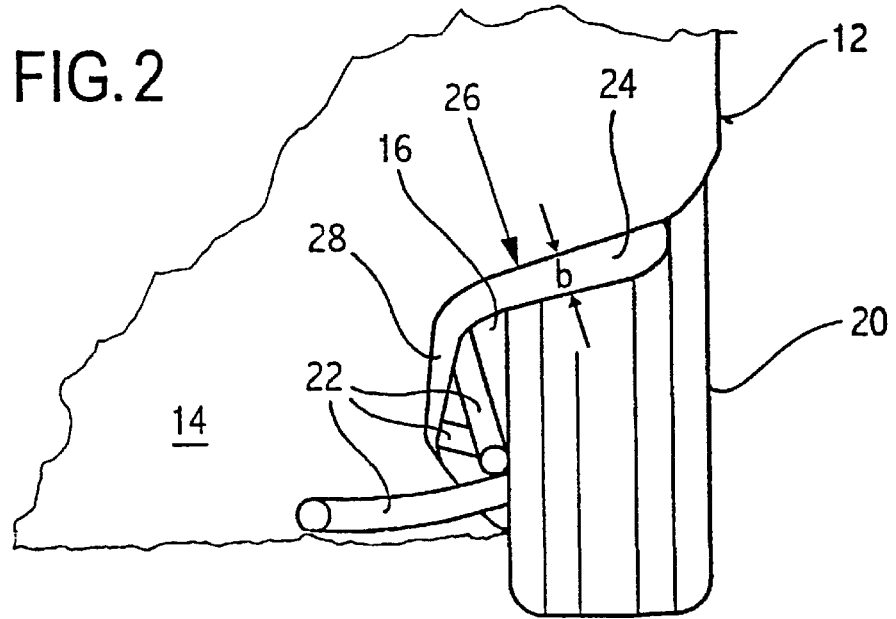
FIG. 2 illustrates a view of the front apron and the underbody with wheel spoiler and deflecting strip on the left front wheel of the passenger car, as viewed in direction X indicated below in FIG. 1.

The front wheels 20 of the passenger car 10 are mounted in the wheelhouses 16, which are suspended so as to be rotatable and guidable by wheel control components 22 (see FIG. 2) which are known and so not described in detail.

Wheel guide joints, wheel bearings, optionally universal joint sleeves, disk brakes, etc (not shown) are mounted by known methods in the wheel dishes, open toward the interior, of the front wheels 20.

A wheel spoiler 24, which extends in the form of a deflecting strip designated as a whole as 26 inward and downward around the wheelhouse 16 more or less to the vertical plane 30 in the center of the wheels 20, is mounted in the area of the wheels 20 on the edge extending between the wheelhouses 16 and underbody 14 or front apron 12.

The section 28 of the deflecting strip 26 situated more or less to the side of the wheels 20 is smaller in width b and serves the purpose in particular of removing water flowing along the underbody 14, in heavy rain for example, this water thus being conducted by the air flow along the deflecting strips 28 past the wheel dishes of the wheels 20 open toward the interior. The wheel spoiler 24 of the deflecting strip 26, on the contrary, is designed on the basis of aerodynamic considerations, but serves also to deflect environmental influences, so that, as is to be seen in FIG. 3, it is advisable for this section 28 to be configured so as not to extend transversely to the direction of approaching flow, but rather obliquely inward.

The deflecting strips 26 may be produced as separate components and fastened to the underbody, by means of bolted connections, for example. The deflecting strips 26 may, however, also be molded directly onto the underbody 14 and/or the wheelhouses 16 by way of suitable extensions. In addition, in the area of the wheel spoilers 24 the deflecting strips 26 may be favorably designed from the aerodynamic viewpoint with a rounded transition from the underbody 14 to the sharp edge of the wheel spoiler 24, while the section 28 preferably has an angular edge so that an efficient deflecting function may be performed. The area 28 could optionally be designed as a catching strip, one U-shaped in cross-section, for example.

As an alternative or addition, the device described may also be provided on the rear wheels in the rear area of the motor vehicle 10.

What is claimed is:

1. A motor vehicle with an underbody and wheels mounted in wheelhouses which are guided on wheel guide elements coupled to the vehicle, at least one functional element being mounted in the area of wheel dishes opening inward, and with a plurality of wheel spoilers each mounted on the underbody in front of a respective wheel in the direction of travel, characterized in that each wheel spoiler ends in a deflecting strip extending more or less vertically downward, the deflecting strip extending continuously inward and rearward of the respective wheel at least as far as a vertical plane intersecting the axis of the respective wheel.

2. A motor vehicle as specified in claim 1, wherein portions of the deflecting strips extending continuously inward and rearward have a greater width than portions of the deflecting strips extending more or less vertically downward.

3. A motor vehicle as specified in claim 1, wherein at least one of the wheel spoilers and the deflecting strips are formed on extensions of the underbody and the adjacent wheelhouses.

4. A motor vehicle as specified in claim 1, wherein the deflecting strips extend along an edge between the underbody and the wheelhouses.

5. A motor vehicle as specified in claim 4, wherein the wheel spoilers and the deflecting strips each constitute an integral component which is mounted on the underbody.

6. A motor vehicle as specified in claim 1, wherein the wheel spoilers and the deflecting strips each constitute an integral component which is mounted on the underbody.

7. A motor vehicle as specified in claim 6, wherein portions of the deflecting strips extending continuously inward and rearward have a greater width than portions of the deflecting strips extending more or less vertically downward.

8. A motor vehicle with an underbody and wheels mounted in wheelhouses which are guided on wheel guide elements coupled to the vehicle, at least one functional element being mounted in the area of wheel dishes opening inward, and with a plurality of wheel spoilers each mounted on the underbody in front of a respective wheel in the direction of travel, characterized in that each wheel spoiler ends in a deflecting strip extending more or less vertically downward, the deflecting strip extending continuously inward and rearward of the respective wheel at least as far as a vertical plane intersecting the axis of the respective wheel and wherein at least one of the wheel spoilers and the deflecting strips are molded at least in part in the underbody of the motor vehicle.

9. A motor vehicle as specified in claim 8, wherein at least one of the wheel spoilers and the deflecting strips are formed on extensions of the underbody and the adjacent wheelhouses.

10. A motor vehicle as specified in claim 8, wherein the deflecting strips extend along an edge between the underbody and the wheelhouses.

11. A motor vehicle with an underbody and wheels mounted in wheelhouses which are guided on wheel guide elements coupled to the vehicle, at least one functional element being mounted in the area of wheel dishes opening inward, and with a plurality of wheel spoilers each mounted on the underbody in front of a respective wheel in the direction of travel, characterized in that each wheel spoiler ends in a deflecting strip extending more or less vertically downward, the deflecting strip extending continuously inward and rearward of the respective wheel at least as far as a vertical plane intersecting the axis of the respective wheel, wherein portions of the deflecting strips extending continuously inward and rearward have a greater width than portions of the deflecting strips extending more or less vertically downward, and wherein at least one of the wheel spoilers and the deflecting strips are molded at least in part in the underbody of the motor vehicle.

12. A motor vehicle as specified in claim 11, wherein the deflecting strips extend along an edge between the underbody and the wheelhouses.

* * * * *